United States Patent
Dincer et al.

(10) Patent No.: US 10,138,761 B2
(45) Date of Patent: Nov. 27, 2018

(54) HEAT ENGINE SYSTEM FOR POWER AND HEAT PRODUCTION

(71) Applicant: University of Ontario, Oshawa (CA)

(72) Inventors: Ibrahim Dincer, Whitby (CA); Calin Zamfirescu, Oshawa (CA)

(73) Assignee: UNIVERSITY OF ONTARIO INSTITUTE OF TECHNOLOGY, Oshawa, ON (CA)

( * ) Notice: Subject to any disclaimer, the term of this patent is extended or adjusted under 35 U.S.C. 154(b) by 572 days.

(21) Appl. No.: 13/974,847

(22) Filed: Aug. 23, 2013

(65) Prior Publication Data

US 2014/0053544 A1    Feb. 27, 2014

Related U.S. Application Data

(60) Provisional application No. 61/692,459, filed on Aug. 23, 2012.

(51) Int. Cl.
*F04C 29/02* (2006.01)
*F04C 2/02* (2006.01)
(Continued)

(52) U.S. Cl.
CPC .......... *F01K 15/00* (2013.01); *F01K 7/36* (2013.01); *F01K 25/065* (2013.01); *F04C 2/025* (2013.01);
(Continued)

(58) Field of Classification Search
CPC ...... F01C 21/001; F01C 21/002; F01C 21/04; F01C 21/045; F01C 21/06; F04C 29/0007; F04C 29/0014; F04C 29/02–29/028; F04C 29/042; F04C 2210/265; F22G 5/12; F22G 5/123; F01D 25/22; F01K 7/34; F01K 7/36; F01K 7/38; F01K 7/42; F01K 7/44; F01K 13/02; F01K 13/025; F01K 19/00; F01K 19/10; F01K 25/065
(Continued)

(56) References Cited

U.S. PATENT DOCUMENTS 3,234,734 A * 2/1966 Buss ............... F01K 21/005
                                             60/651
3,690,303 A * 9/1972 Dolezal ............. F22B 35/105
                                             122/406.4
(Continued)

FOREIGN PATENT DOCUMENTS

JP   WO 2012104934 A1 * 8/2012 ........... F01C 1/0207
WO   WO 2014017943 A1 * 1/2014 ............. F01K 7/16

*Primary Examiner* — Laert Dounis
(74) *Attorney, Agent, or Firm* — Praxis

(57) ABSTRACT

A heat engine system comprises a first heat exchanger, an expander, a second heat exchanger and a valve assembly. The first heat exchanger is in fluid communication with a heat source for heating a working fluid therein. The expander is downstream the first heat exchanger and is in fluid communication therewith for receiving the heat working fluid. The second heat exchanger is downstream the expander and in fluid communication therewith for cooling down the working fluid received therefrom. The valve assembly is in fluid communication with the second heat exchanger and the expander for providing for selectively injecting the expander with cooled working fluid from the second heat exchanger.

8 Claims, 17 Drawing Sheets

(51) Int. Cl.
    *F04C 18/02*     (2006.01)
    *F01K 25/06*     (2006.01)
    *F01K 15/00*     (2006.01)
    *F04C 29/00*     (2006.01)
    *F01K 7/36*     (2006.01)
    *F04C 29/04*     (2006.01)

(52) U.S. Cl.
    CPC ...... *F04C 18/0207* (2013.01); *F04C 29/0007* (2013.01); *F04C 29/02* (2013.01); *F04C 29/042* (2013.01)

(58) Field of Classification Search
    USPC ......... 60/643, 646, 651, 653, 657, 667, 671, 60/670; 418/55.1–55.6
    See application file for complete search history.

(56) References Cited

U.S. PATENT DOCUMENTS

| | | | | |
|---|---|---|---|---|
| 3,760,868 A * | 9/1973 | Cywin | ............. | F01K 17/04 165/45 |
| 4,208,882 A * | 6/1980 | Lopes | ............. | F01D 19/02 122/479.1 |
| 5,321,944 A * | 6/1994 | Bronicki | ............. | F01K 23/10 60/728 |
| 5,555,731 A * | 9/1996 | Rosenblatt | ............. | F01K 25/08 60/651 |
| 6,234,400 B1 * | 5/2001 | Guyer | ............. | F01K 17/02 237/12.1 |
| 6,615,598 B1 * | 9/2003 | Wang | ............. | F04C 23/008 62/197 |
| 7,350,372 B2 * | 4/2008 | Wells | ............. | F25B 15/02 62/238.5 |
| 8,215,114 B2 * | 7/2012 | Smith | ............. | F01C 1/16 60/651 |
| 8,739,541 B2 * | 6/2014 | Ast | ............. | F01K 23/065 60/651 |
| 2009/0139227 A1 * | 6/2009 | Nakasuka | ............. | F01C 1/22 60/517 |
| 2010/0194111 A1 * | 8/2010 | Van Den Bossche | ............. | F01K 3/247 290/2 |

* cited by examiner

SECTION J-J    FIGURE. 11D

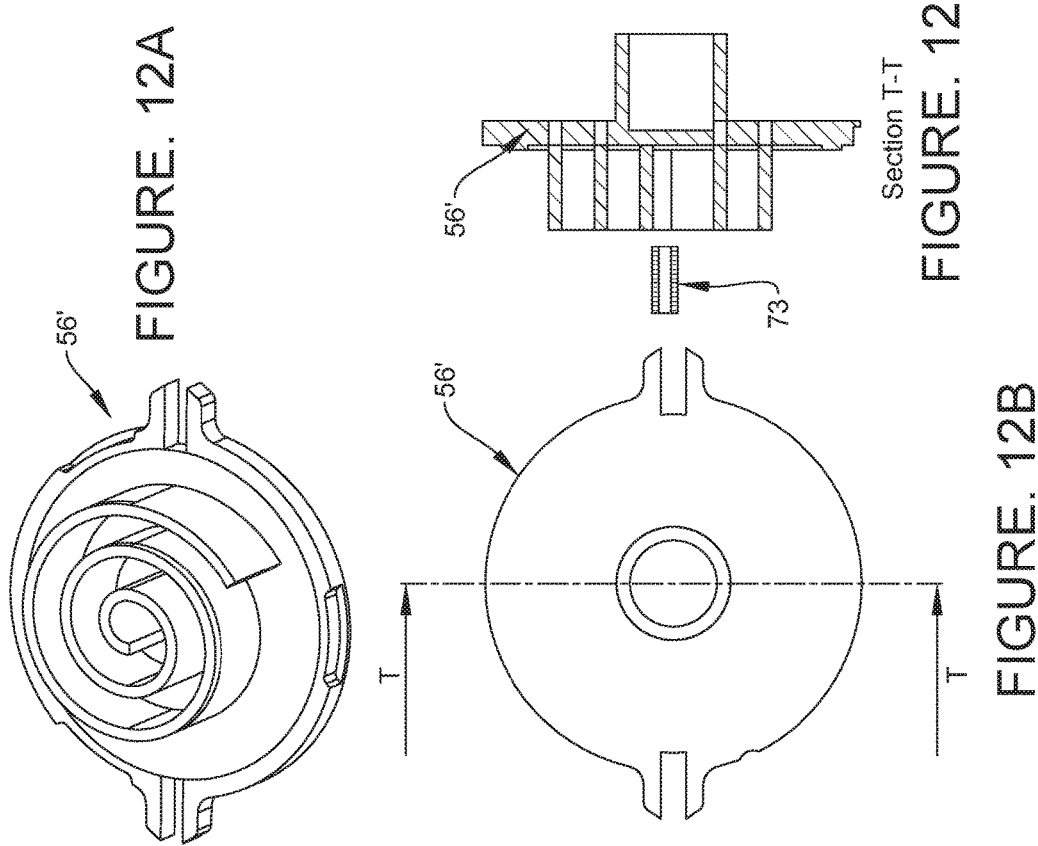

HEAT ENGINE SYSTEM FOR POWER AND HEAT PRODUCTION

CROSS-REFERENCE TO RELATED APPLICATIONS

The present application claims priority on U.S. Provisional Patent Application No. 61/692,459 filed on Aug. 23, 2012 and on Canadian Patent Application No. 2,787,614 filed on Aug. 23, 2012 which are both incorporated by reference herein in their entirety.

TECHNICAL FIELD

The present disclosure relates to a heat engine system for power and heat production. More specifically, but nor exclusively, the present disclosure relates to a heat engine system used to generate electric power and heat from a low-temperature source

BACKGROUND

There is a large consumer demand for a safe and versatile system for power and heating of residences, which also can be exported throughout the world. The residential sector worldwide consumes about 40% of the total energy production. Heat generating systems which are grid independent, efficient, environmentally benign and sustainable are sought after. Natural gas furnaces typically supply heat and consume electricity that comes from the grid. The difficulty with this general practice is that it is not blackout insensitive. That is, in case of blackouts the heating system will not operate because it needs electricity, although the source of combustion, natural gas or oil, is present. The foregoing can lead to crucial situations during winter season.

OBJECTS

An object of the present disclosure is to provide a grid-independent heat engine system for heat production.

An object of the present disclosure is to provide a heat engine system for power production.

An object of the present disclosure is to provide a heat engine system for generating electric power and heat (for water heating and or space heating) from a low-temperature source.

SUMMARY

In accordance with an aspect of the disclosure there is provided a heat engine system comprising: a first heat exchanger in fluid communication with a heat source for heating a working fluid therein; an expander downstream the first heat exchanger and in fluid communication therewith for receiving the heated working fluid; a second heat exchanger downstream the expander and in fluid communication therewith for cooling the working fluid received therefrom; and a valve assembly in fluid communication with the second heat exchanger and the expander for providing for selectively injecting the expander with cooled working fluid from the second heat exchanger.

In an embodiment, the second heat exchanger is in fluid communication with the first heat exchanger for providing the cooled working fluid to flow thereto.

In an embodiment, the heat engine system comprises a pump for circulating the working fluid. In an embodiment, the valve assembly comprises a three-way valve. In an embodiment, the three-way valve is also in fluid communication with the pump and the first heat exchanger.

In an embodiment, the first heat exchanger comprises a desorber.

In an embodiment, the second heat exchanger comprises a resorber. In an embodiment, the second heat exchanger provides for producing heat from cooling down working fluid.

In an embodiment, the expander comprises a scroll expander. In an embodiment, the scroll expander comprises a fixed scroll and an orbiting scroll. In an embodiment, the fixed scroll comprises a channel for receiving the injected working fluid therein from the valve assembly. In an embodiment, the channel comprises a tube. In an embodiment, the expander comprises a shaft in operational communication with magnetic coupling for generating electricity. In an embodiment, the magnetic coupling provides for transmitting rotation shaft power outside a hermetically sealed enclosure and thereby run an electric generator to produce electricity.

In an embodiment, the valve assembly is interposed between the first and second heat exchangers.

In an embodiment, the heat source is a low temperature heat source.

In an embodiment, the working fluid comprises ammonia-water mixture.

In an embodiment, an additional heat exchanger is interposed between the valve assembly and the first heat exchanger to preheat the working fluid. In an embodiment, the additional heat exchanger is in fluid communication with the expander and thereby receives and preheats the working fluid received via the valve assembly by cooling down the hotter fluid received by the expander. In an embodiment, the additional heat exchanger can be used to regenerate heat internally within the thermodynamic cycle, thereby providing heat for preheating the working fluid before the desorber and simultaneously providing cooling for lowering the working fluid enthalpy after the expander.

In an embodiment, a superheater is interposed between the desorber and the expander.

In an embodiment, the second heat exchanger is comprised of two heat exchangers in series which can be used to provide heating at two temperature levels (higher and lower).

In an embodiment, the working fluid simultaneously acts as a lubricant and a coolant.

In accordance with an aspect of the present disclosure, there is provided a method for producing electrical power and heat comprising: heating a working fluid by way of a heat source; circulating the heated working fluid through an expander operationally connected to an electrical generator for actuation thereof; cooling the heated working fluid flowing out of the expander thereby generating heat; returning the cooled working fluid to the heat source; and selectively injecting the expander with cooled working fluid.

In accordance with an aspect of the present disclosure, there is provided a scroll expander for a heat engine system comprising: a fixed scroll comprising a channel in fluid communication with a valve in fluid communication with a working fluid in a liquid state; an orbiting scroll for orbiting relative to the fixed scroll, the fixed and orbiting scrolls providing for receiving working fluid in a gaseous state there between, wherein the channel provides for selectively mixing liquid state working fluid with gaseous state working fluid between the fixed and orbiting scrolls.

In an embodiment, the channel comprises an embedded channel. In an embodiment, the channel comprises an attached tube.

In an embodiment, there is provided an improved and versatile heating system that can be coupled to multiple types of energy sources such as conventional fuels and/or biomass combustion or concentrated solar radiation and that does not require power for its auxiliary equipment (blowers, pumps, controllers and the like). The system can be successfully applied to cottages and remote locations for water heating, space heating and lighting or other power needs (e.g., refrigeration, appliances) using locally available fuels or solar thermal energy input.

Other objects, advantages and features of the present disclosure will become more apparent upon reading of the following non-restrictive description of illustrative embodiments thereof, given by way of example only with reference to the accompanying drawings.

BRIEF DESCRIPTION OF THE DRAWINGS

In the appended drawings, where like reference numerals denote like elements throughout and in where:

FIG. 11D is a bottom plan view of the fixed scroll of FIG. 11A;

FIG. 12A is a perspective view of the orbiting scroll of the expander in accordance with a non-restrictive embodiment in which the liquid injection is performed using a tube which is not part of the scroll head;

FIG. 12B is a bottom plan view of the orbiting scroll of FIG. 12A;

FIG. 12C is a section view of the orbiting scroll taken along line T-T of FIG. 12B;

FIG. 12D is top plan view of the orbiting scroll of FIG. 12D;

DETAILED DESCRIPTION OF ILLUSTRATIVE EMBODIMENTS

Generally stated, there is provided a heat engine system that comprises a first heat exchanger such as a desorber, an expander such as a scroll expander, a second heat exchanger such as a resorber and a valve assembly. The desorber is in fluid communication with a heat source for heating a working fluid therein, such as a low temperature heat source. The scroll expander is downstream the desorber and is in fluid communication therewith for receiving the heated working fluid. The resorber is downstream the expander and in fluid communication therewith for cooling down the working fluid received therefrom. The resorber is also in fluid communication with the desorber for providing the cooled working fluid to flow thereto. The valve assembly is in fluid communication with the resorber and the scroll expander via a channel through the scroll structure for selectively injecting the scroll expander with cooled working fluid from the second heat exchanger. In an embodiment, the working fluid is ammonia water.

With reference to the Figures, non-restrictive illustrative embodiments will now be described.

Figure 1:
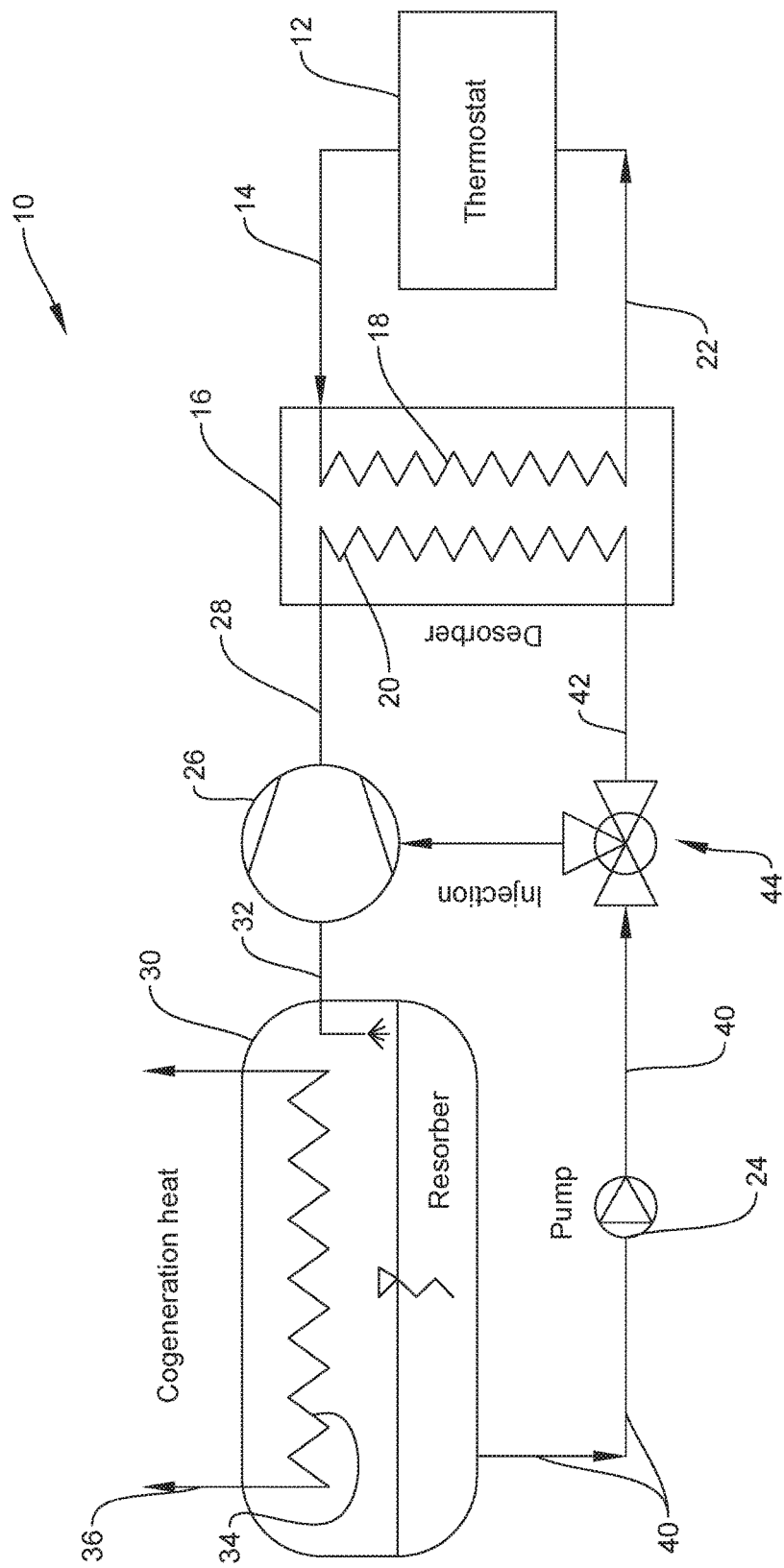
FIG. 1 is a schematic representation of the heat engine system in accordance with a non-limiting illustrative embodiment of the present disclosure.

FIG. 1 shows a heat engine system 10 in the form of an assembly of devices in fluid communication via conduits interposed between the devices thereby forming a circuit for the flow of a working fluid therein.

The system 10 includes a heat source 12 such as a "thermostat" or other suitable heat source which can be provided in the form of a hot fluid or a concentrated solar energy to give but two non-limiting example. The heat source 12 provides for heating the working fluid within system 10. The heat source 12 heats a fluid that expands and is transferred via a conduit 14 to desorber 16 such as heat exchanger in the form of a plate heat exchanger to give but one non-limiting example. More particularly, the heated fluid from the heat source 12 flows within a conduit 18 and heats the working fluid within conduit 20. The cooled down fluid flows back from the desorber 16 to the heat source 12 via a conduit 22 to be reheated and restart the above cycle.

A pump 24 provides for circulating the working fluid within the circuit defined by the system 10. In an embodiment, the pump 24 is a variable speed pump.

The heated working fluid flows from the desorber 16 to an expander 26 via conduit 28. As will be further discussed herein, the expander 26 comprises a housing with a shaft for rotation thereof actuated by the working fluid. A magnetic coupling provides for transferring the shaft movement to the exterior of the housing converting the shaft work into electricity and causing the working fluid to flow into a resorber 30 via conduit 32.

In an embodiment, the resorber 30 comprises a shell-and-plate heat exchanger. The resorber 30 absorbs the heat of the working fluid and thus generates heat as an additional by-product. In essence, the working fluid flows into the resorber 30 as steam which heats another lower temperature fluid in conduit 34 that flows out of system 10 via a conduit 36 and is returned for re-heating via a conduit 38. The lower temperature fluid in conduit 34 of course, cools down and liquefies the working fluid which is pumped out of the resorber 30 via conduit 40 by pump 24.

Therefore, resorber cooling is provided to the two-phase mixture through heat sink. As such, a combined process of condensation and absorption occurs.

The working fluid of course is pumped back into the desorber 16 to be re-heated via conduits 40 and 42.

The system includes a valve assembly 44 in fluid communication with the expander 26 via a conduit 46. The vale assembly provides for selectively injecting cooled down or liquefied working fluid into the expander 26. This cool liquid acts as a sealant, coolant and lubricant. In an embodiment, the valve assembly 44 comprises an automated three-way valve for liquid injection. Therefore, the concentration of the working fluid within the expander as well as its temperature can be regulated during the cycle of the working fluid through the circuit defined by the system 10.

Figure 2:
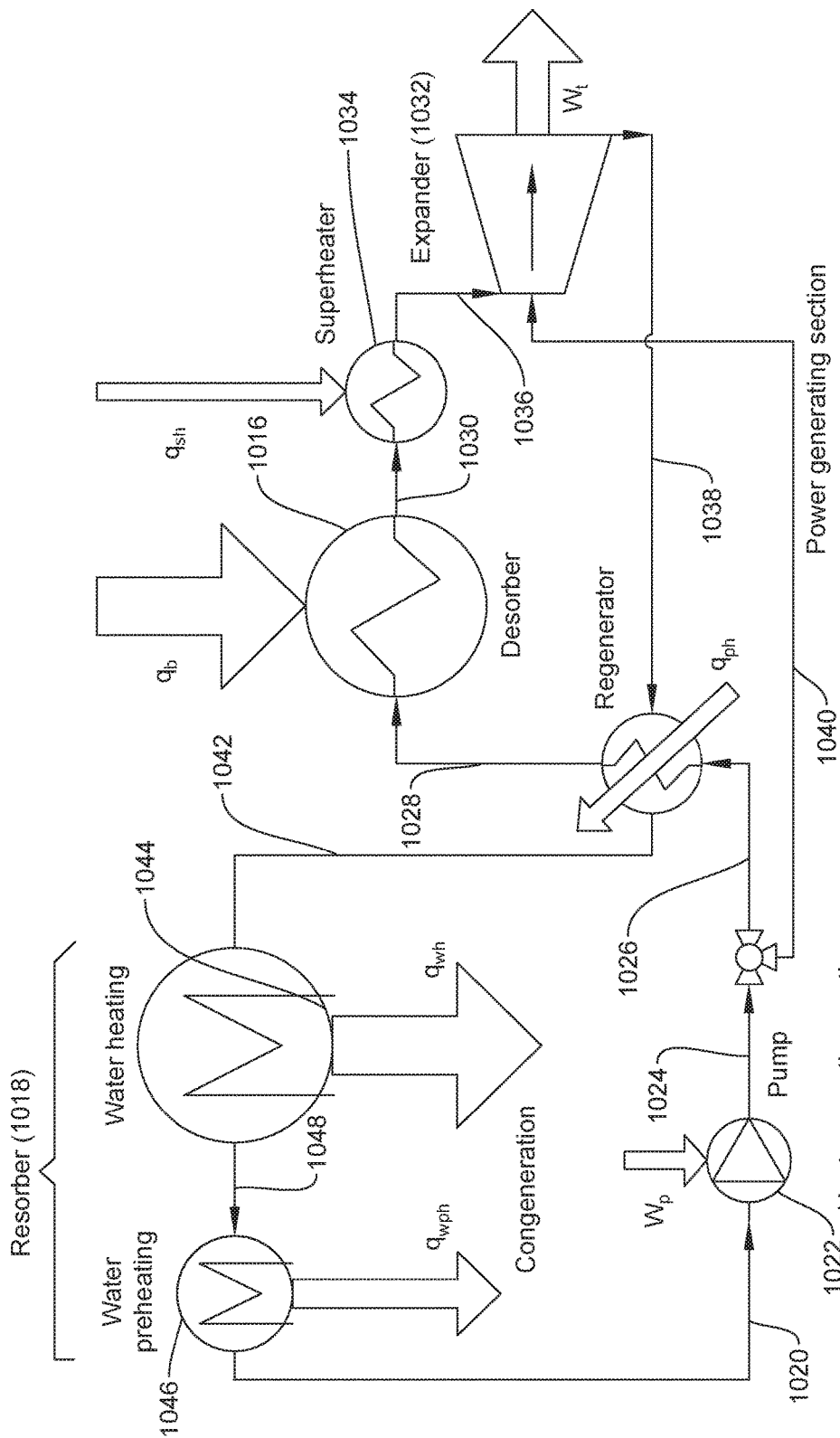
FIG. 2 is a schematic representation of the heat engine system in accordance with yet another non-limiting illustrative embodiment of the present disclosure.

FIG. 2 shows a heat engine system 1010 that is similar to the system 10 and further provides for the use of a regenerative heat exchanger as working fluid preheater. In an embodiment, preheating the working fluid before boiling improves the efficiency within the range of 1-2%. Furthermore, the cogenerated heat is provided in form of water preheating and water heating as well, where water preheating operates at lower temperature level than water heating system.

System 1010 includes an additional heat exchanger 1012 in the form of a preheater interposed between the valve assembly 1014 (which is a three-way valve) and a first heat exchanger 1016 in the form of a desorber. As such, the working fluid returning into the system from the second heat exchanger, namely the resorber 1018 is in a slightly subcooled state within conduit 1020 and is pressurized by pump 1022 to flow to the three-way valve 1014 via conduit 1024. The pressurized working fluid is then directed by the three-way valve 1014 via conduit 1026 to the preheater 1012 to produce a heated, high-pressure liquid close to saturation that flows via conduit 1028 to the desorber 1016. The working fluid is further heated in the desorber 1016 and dry ammonia-water vapor is generated in conduit 1030 which leads to the expander 1032.

In an embodiment, there is provided a superheater 1034 interposed between the desorber 1016 and the expander 1032 for superheating the working fluid and thereby allowing the working fluid at the highest temperature in conduit 1036 to pass through the expander 1032 thereby generating rotation shaft work. The hotter working fluid from the expander 1032 flows via conduit 1038 to the preheater 1012 to be cooled down by the cooler working fluid that flows to the expander 1012 from the three-way valve 1014, the latter working fluid is as mentioned before heated up and flows to the desorber 1016 via conduit 1029.

Moreover, the three-way valve provides for injecting colder liquid into the expander 1032 via conduit 1040 for lubrication and cooling the vanes. This injected liquid also acts as additional working fluid and slightly enhances the generated power.

As mentioned above, the expanded low-pressure fluid in conduit 1038 is cooled in the preheater 1012 that regeneratively preheats the pressurized working fluid and the resulting colder working fluid from preheater 1012 flowing in conduit 1042 is still warm enough (e.g. about 80° C.) such that it can be useful for cogeneration in resorber 1018.

In an embodiment, the resorber 1018 is comprised of two heat exchangers 1044 and 1046 in series and in fluid communication via conduit 1048 in series which can be used to provide heating at two temperature levels (higher and lower). The first cogeneration heat exchanger 1044 decreases the working fluid temperature down to a range between about 50° C. to about 60° C. for example, whence being capable for water heating and space heating applications for example. The second cogeneration heat exchanger 1046 decreases the temperature of the working fluid down to about 25° C., for example, being thus applicable for fresh water preheating purpose for example.

Figure 3:
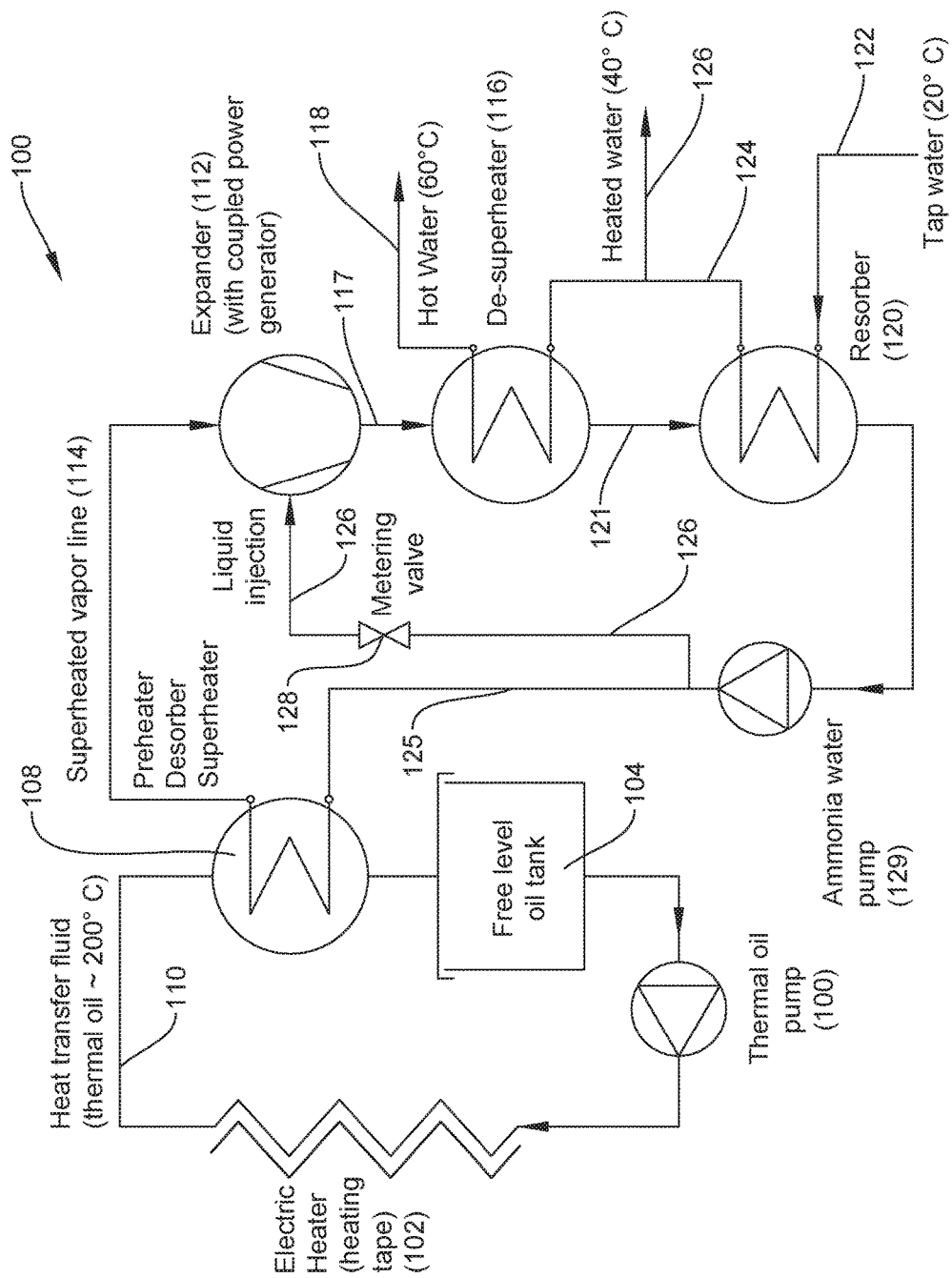
FIG. 3 is a schematic representation of the heat engine system in accordance with yet another non-limiting illustrative embodiment of the present disclosure.

FIG. 3 shows another embodiment of a heat engine system 100. The circuit includes an electric heater 102 that heats oil from a heat oil tank 104 which flows thereto by way of the action of a thermal oil pump 106. The electric heater 102 is in fluid communication with a Preheater/Desorber/Superheater 108 by way of a conduit 110 in order to receive heat transfer fluid at about 200° C. The heated fluid flows into an expander 112 (which is coupled to a power generator) via a superheated vapour line 114, Fluid from the expander 112 flows into a de-superheater 116 by way of a conduit 117. Water from the de-superheater is released at 60° C. via conduit 118. Fluid from the de-superheater flows into the resorber 120 via conduit 121. The resorber receives tap water (20° C.) via a conduit 122. The water flows into the de-superheater by way of conduit 124 which releases excess heated water at 40° C. via conduit, The resorber 120 Is in fluid communication with an ammonia-water pump which pumps ammonia-water into the Preheater/Desorber/Superheater 108 via conduit 125 and provides for injecting liquid directly into the expander 112 via a metering valve by through conduit 126 via a metering valve 128.

Turning to FIGS. 4-12D, the expander 26 and the expander-generator assembly in accordance with non-restrictive illustrative embodiments of the present disclosure will be described.

In one example, the expander 26 comprises a positive displacement scroll type. In another example, for capacity higher than 10 kW electric screw expanders can be used instead.

Figure 4:
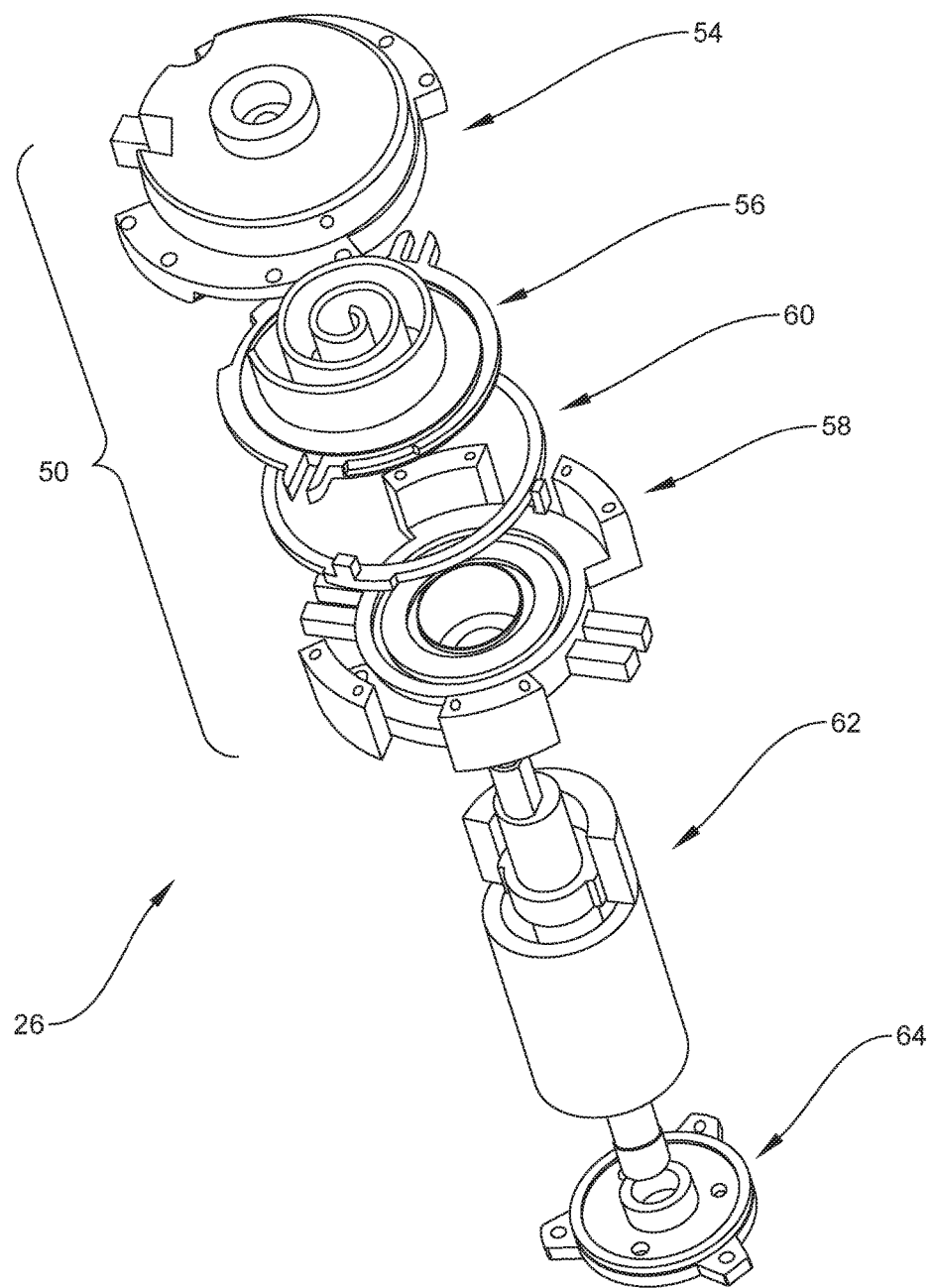
FIG. 4 is an exploded perspective view of the of the expander of the heat engine system in accordance with a non-limiting illustrative embodiment of the present disclosure.

FIG. 4 shows the expander 26 comprising a scroll head 50 mounted to a cylindrical housing body 52. In one embodiment, the housing is a semi-hermetic.

The scroll head 50 comprises a pair of interleaving scrolls, namely a fixed scroll 54 and an orbiting scroll 56 mounted to a support 58 with journal bearings via an Oldham coupling 60. The orbiting scroll 54 orbits eccentrically in relation to the fixed scroll 54.

The cylindrical housing 52 houses a balanced shaft 62 mounted to bearing 64 at one end and to the scroll head 50 at the other end so as to rotate about its vertical axis. At the shaft bottom is attached the magnetic coupling (not shown) comprising the driver and the driven parts. In an embodiment, the magnetic coupling drives an off the shelf generator of the type of a three-phase alternator (not shown).

In an embodiment, an electrical generator with inverter capable of being connected to the grid or to work independently is in operational communication with the expander 26.

Figure 5:
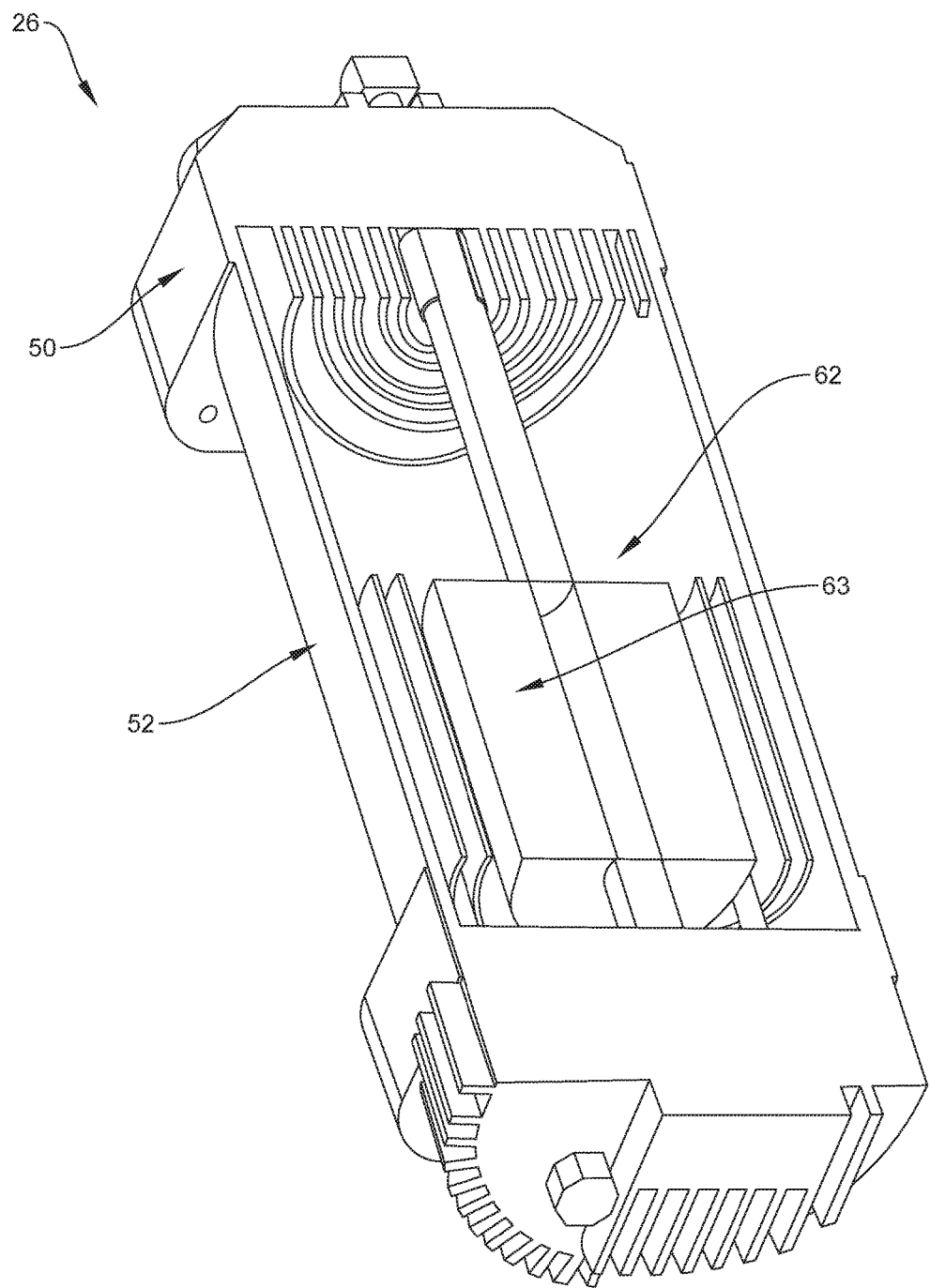
FIG. 5 is a perspective cross-sectional view of an expander in accordance with another non-restrictive embodiment.

FIG. 5 shows an expander 26' in which the generator 63 is incorporated within the same body and is capable to be used with organic working fluids that do not attack the copper wires of the generator 63.

Figure 6A:
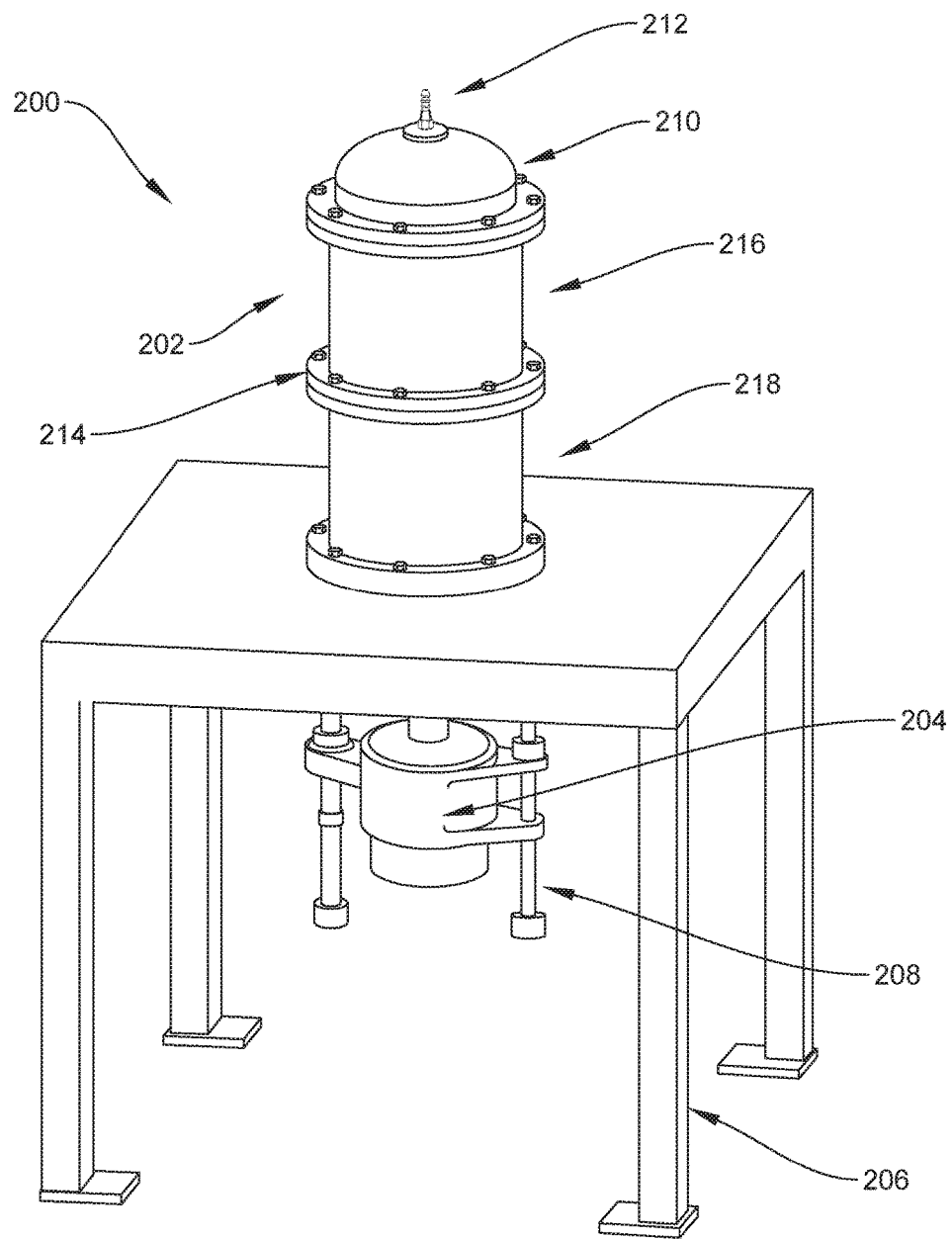
FIG. 6A is perspective of an expander generator-assembly in accordance with a non-limiting illustrative embodiment of the present disclosure and comprising the expander of FIG. 4.
Figure 6B:
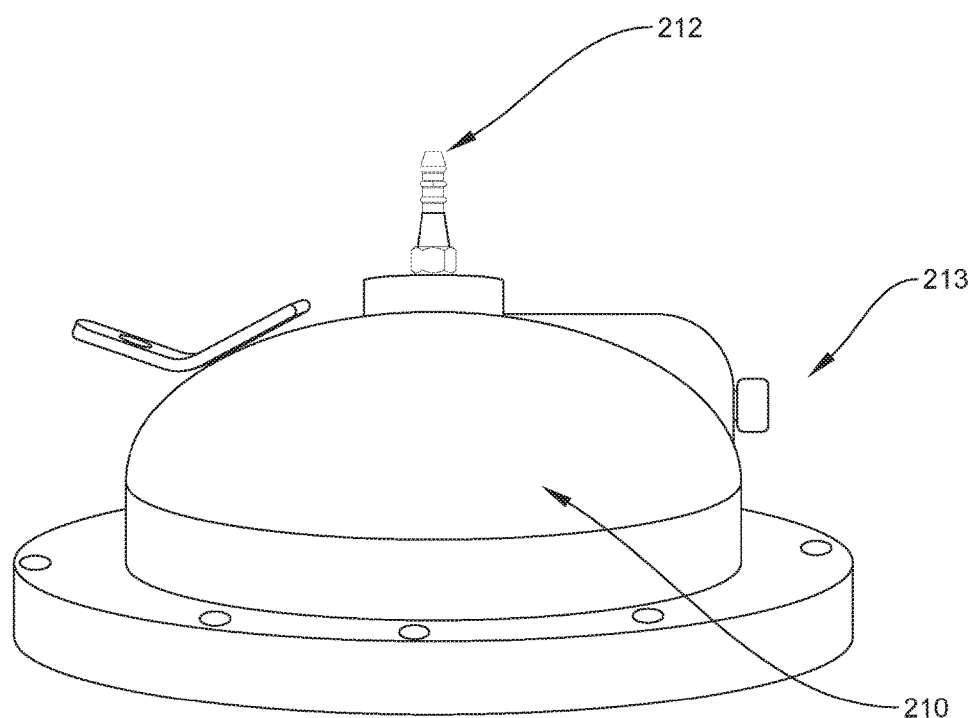
FIG. 6B is a perspective view of the upper cap of the expander generator-assembly of FIG. 6A.

FIG. 6A shows an expander-generator assembly 200 including an expander 202, a generator 204 coupled magnetically to the expander 202. The generator is connected to a supporting system 206 via guide members 208 in the form of rods. The expander is mounted to the supporting system 206 and is shown including an upper cap 210 with a liquid injection port 212 mounted to body 214 comprising upper and lower portions, 216 and 218 respectively. FIG. 6B shows that in an embodiment, the upper cap 210 is a double-wall cap including a gas inlet port 213 as well as the liquid injection port 212.

Figure 7:
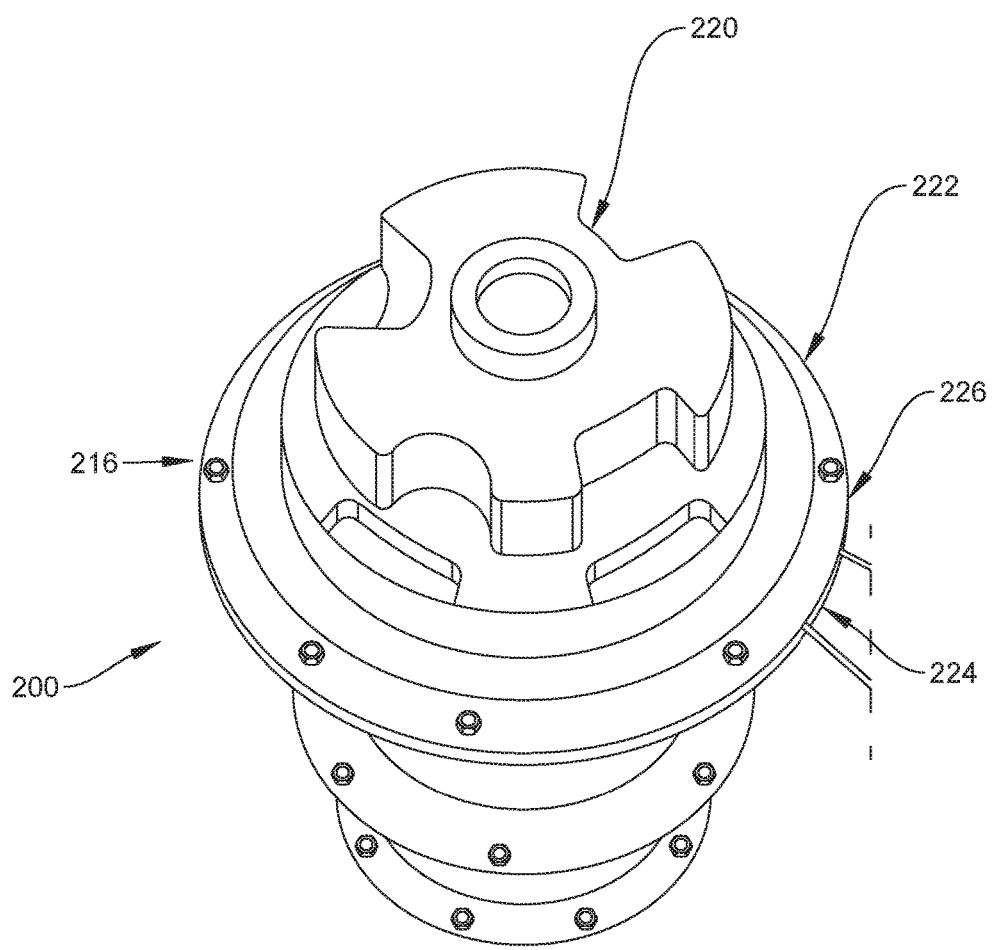
FIG. 7 is a top perspective view of the expander of the expander generator-assembly of FIG. 6A showing the fluid entrance and exit ports in the scroll assembly.

FIG. 7 shows the expander 202 without the cap 210 revealing the fluid inlet port 220 and the expander outlet opening 222, the flange 224 for fixing the upper cap 210 thereon and the gasket 226 for sealing.

Figure 8:
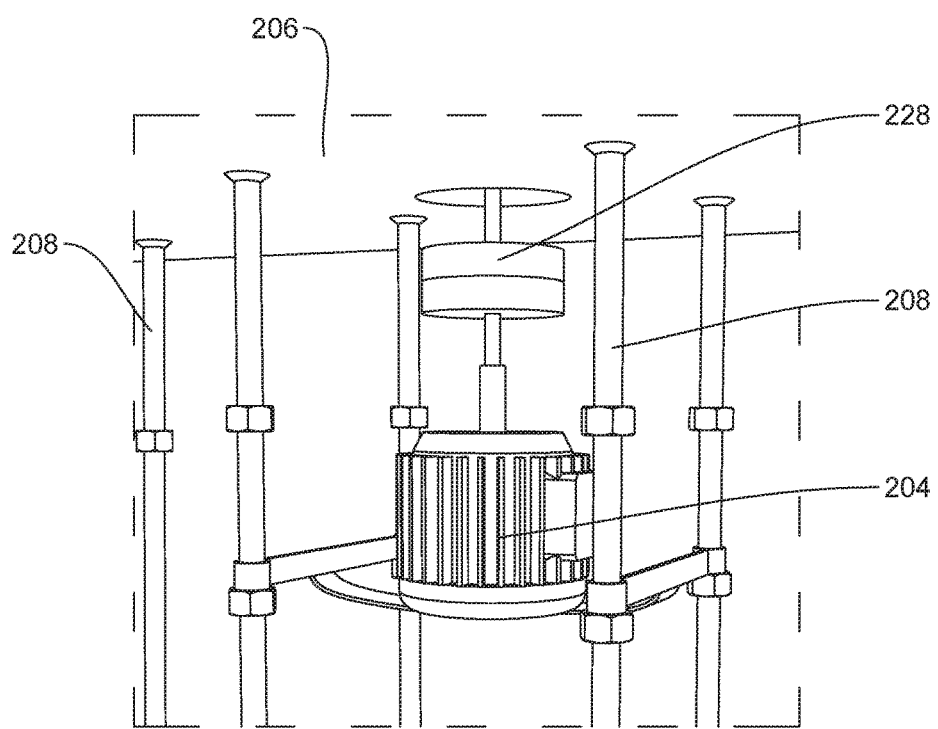
FIG. 8 perspective view of the lower part of the expander-generator assembly of FIG. 6A.

FIG. 8 shows the lower part of the expander-generator assembly 200 including the power generator 204 mounted to the supporting system via the guiding rods 208. The generator is in operational communication with the expander via a magnetic coupling 228

Figure 9:
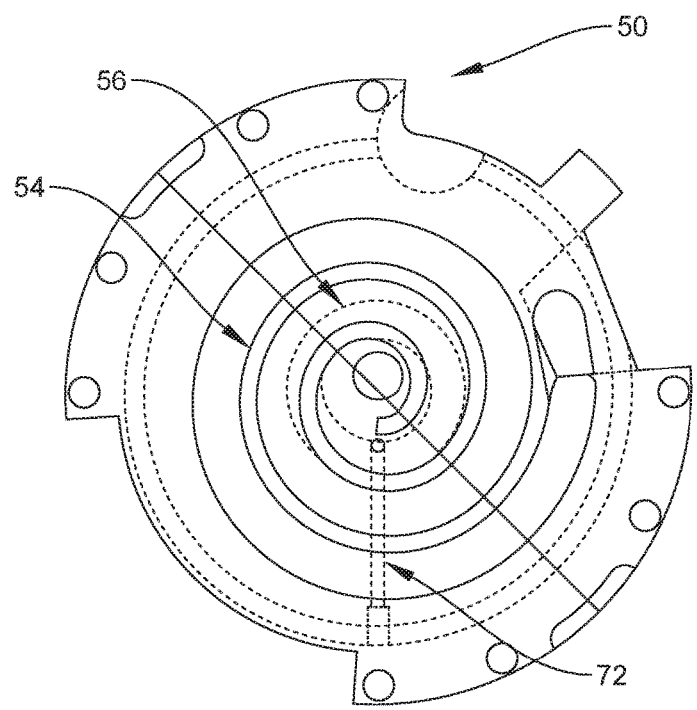
FIG. 9 is a top plan view of the scroll head of the expander of FIG. 4, in accordance with nonrestrictive embodiment in which a liquid injection channel is machined in the body of the scroll head, the fixed scroll is shown in solid line and the orbiting scroll shown in stippled lines.
Figure 10:
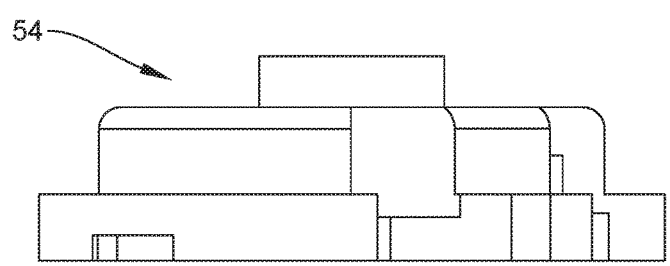
FIG. 10 is a lateral view of the scroll head of FIG. 9.
Figures 11A, 11B:
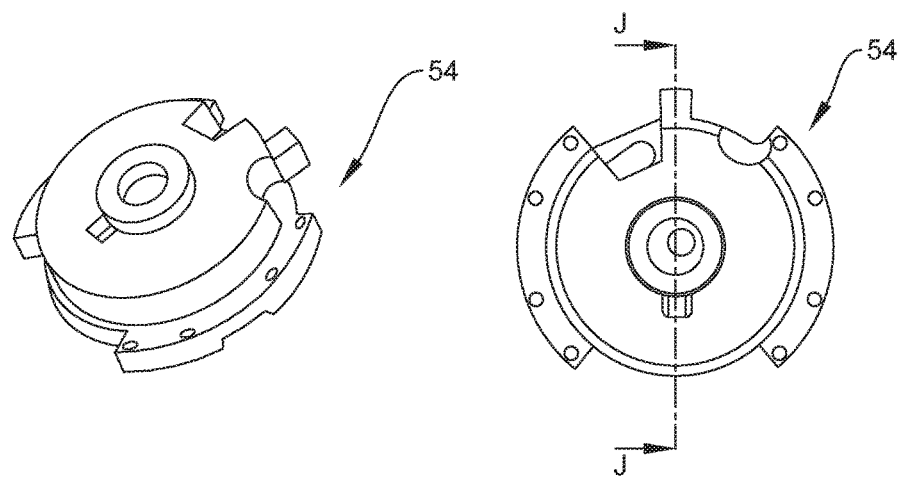
FIG. 11A is top perspective view of the fixed scroll of the expander of FIG. 4.
FIG. 11B is a top plan view of the fixed scroll FIG. 11A.
Figure 11C:
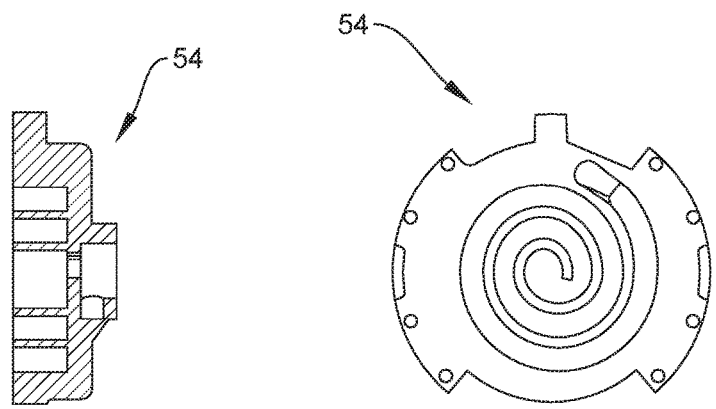
FIG. 11C is a sectional view of the fixed scroll taken along line J-J of FIG. 11B.

With reference to FIGS. 9 and 10, the head 50 includes an injection channel 72 through the fixed scroll 54 in fluid communication with conduit 46. The channel 72 allows for liquid phase working fluid to be injected into the scroll head 50 between the interleaving wall of the fixed scroll 54 and the orbiting scroll 56 which contains gas phase working fluid. The injection is performed from the side and liquid is injected at a location corresponding to the beginning of the expansion cycle.

FIGS. 11A-11D show the fixed scroll 54 of the scroll head 50.

FIGS. 12A-12D show orbiting scroll 56' in which the liquid injection is performed using a tube 73 which is not part of the scroll head 50.

In an embodiment, the system 10 is a stand-alone modular unit which can convert heat transferred for a heat source of 100° C.-200° C. to electrical power and to water heating or space heating.

In an embodiment, system is black-out insensitive because it generates its own electricity in addition to producing a net power output.

In an embodiment, the working fluid is ammonia-water. The foregoing provides for obtaining further benefits by expanding the fluid at the most convenient thermodynamic state in addition with regulating the cycle through on-line adjustment of the ammonia concentration of the working fluid via the injection valve assembly 44 and channel 72. In an embodiment, a part of the liquid is injected into the expander at the beginning phase of the expansion process. The concentration of ammonia in the working fluid can be adjusted through a corroborating adjustment of pump speed, valve opening and the expander load.

Figure 13:
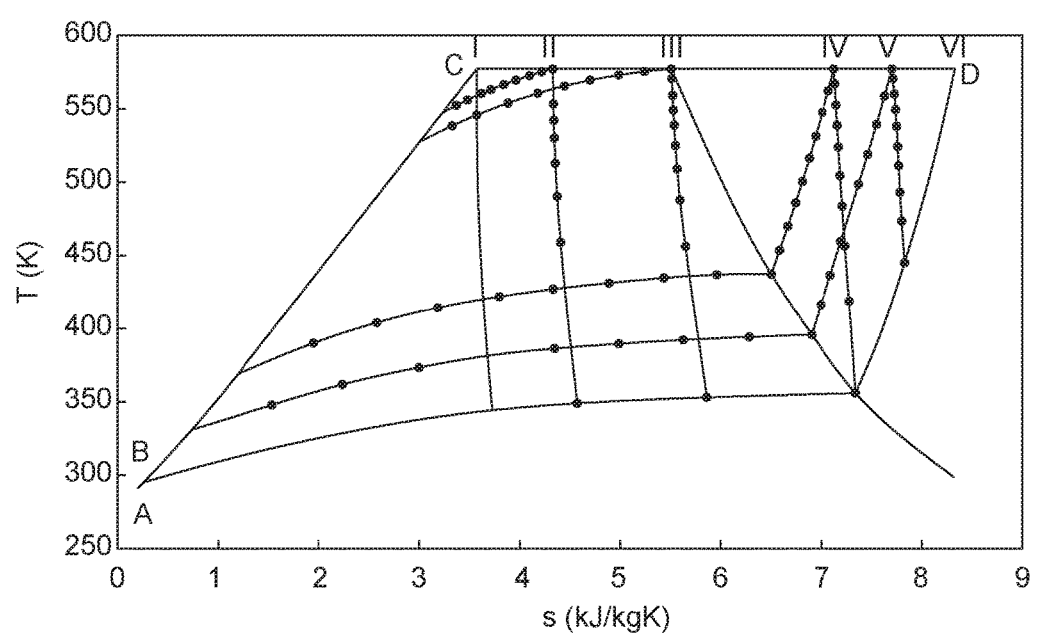
FIG. 13 is a temperature-entropy diagram of the thermodynamic cycle of the working fluid within the heat engine system in accordance with a non-limiting illustrative embodiment of the present disclosure.
Figure 14:
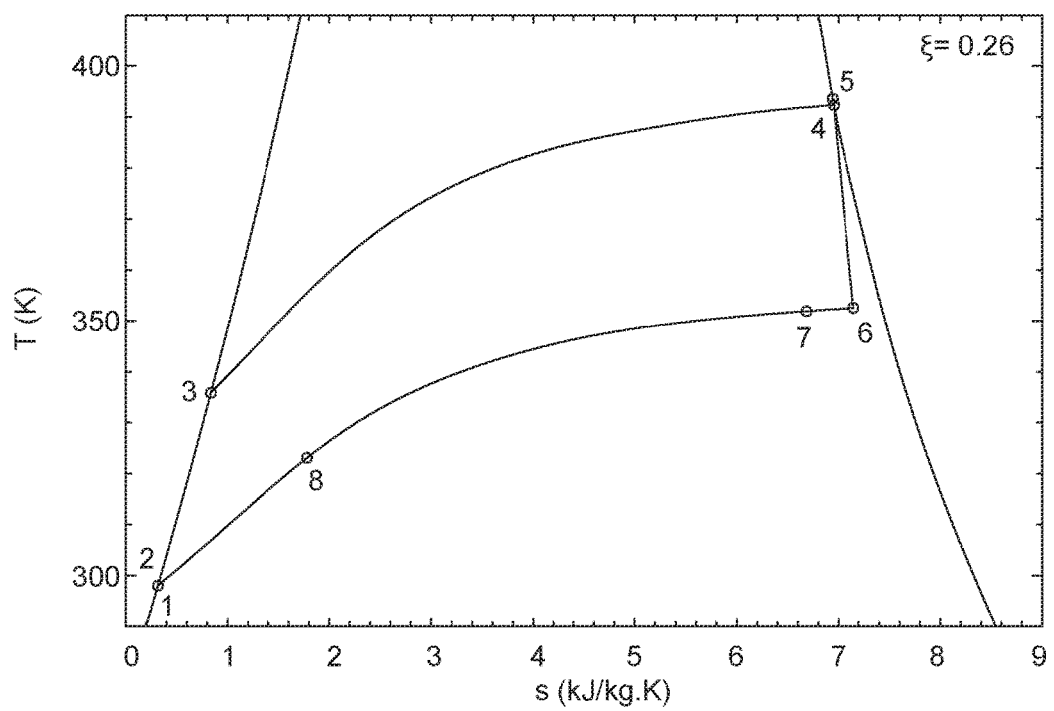
FIG. 14 is a temperature-entropy diagram of the thermodynamic cycle of the working fluid within the heat engine system of FIG. 2 in accordance with a non-limiting illustrative embodiment of the present disclosure.

As shown in FIGS. 13 and 14, the thermodynamic cycle represented in the temperature-entropy diagram morphs while changing the ammonia concentration. The cycle expanding in (I) is basically the trilateral flash cycle. The cycle expanding in (II) operates completely in two phase, while (V) expands in superheated vapor region.

In an embodiment, there is provided a method of regulating the thermodynamic cycle the working fluid (e.g. ammonia-water) through on-line adjustment of the working fluid concentration (e.g. ammonia concentration) such that power production is maximized under fluctuating temperature at the hot end. The foregoing represents an advance in the state of the art of Rankine cycles in general and solar driven heat engines in particular. This aspect, combined with the feature of the Rankine cycle to match the temperature levels (profiles) at sink and source assures a higher energy efficiency of the system with respect to concentrated the common Stirling and organic Rankine cycle alternatives. Moreover, the use of an optimized design for the two heat exchangers (primarily desorber and resorber) and a developed computer controlling system contribute to the efficiency of the present system.

It is well known that ammonia-water as working fluid is corrosive. The assembly of the system therefore, comprises suitable gaskets and valves to avoid any spills of ammonia out of the system. It is also advantageous to not use large quantity of ammonia in the system. In fact water-ammonia solutions are customarily used in households for cleaning.

Several experimental trials where performed with an expander modified from a scroll Bitzer compressor to verify the crucial issues of the design. This unit was designed for air conditioning applications of transport vehicles and includes a low voltage motor with 26 V electric DC power supplies. A permanent magnet motor is incorporated in the same housing as the scroll unit, was well as an electronic block which comprises an inverter with the role to convert the DC current to a three-phase AC current that required driving the unit in compressor mode. In expander-mode operation, a three-phase AC current generates as the shaft rotates, and the inverter plays the role of a rectifier to transform the AC current to DC current.

A Rankine engine and expander test bench system has also been devised and built. The test bench comprises a hot air duct channel insulated from the exterior where hot air at ~200° C. is produced and recycled to simulate a hot gas source of any kind. The hot air exchanges heat with the heat engine system through a heat exchanger such that the heat is transferred to the heat engine bench system. Under the force of high temperature and high pressure vapor of working fluid the scroll expander turns and drives a three-phase alternator which generates AC current. The AC current is rectified and applied to a resistive load which simulates any load that may be found in practice.

Figure 15:
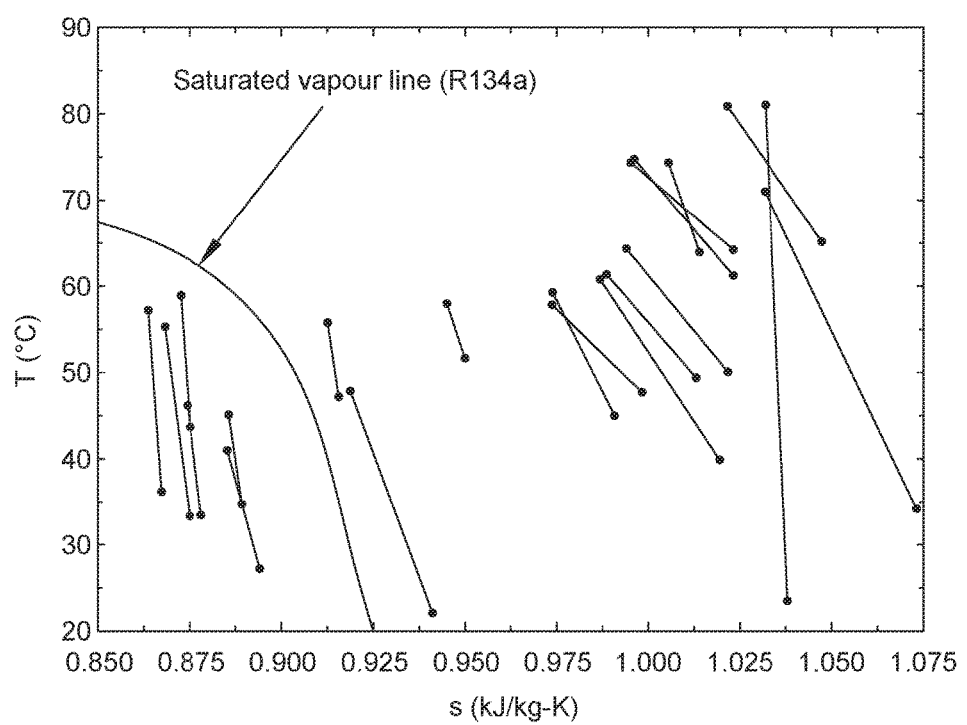
FIG. 15 is summary of the measured expansion processes represented in a T-s diagram.

FIG. 15 shows a summary of measurements done with the expander with the working fluid R134*a*. There is an optimal expansion ratio. In the positive displacement expanders, the pressure ratio of the expanded flow is correlated to the built-in volume ratio. In this regard, the pressure ratio between the higher and lower side of the Rankine cycle, must be correlated to the built-in volume ratio. If they are not, then the expander operation is non-optimal.

Figure 16:
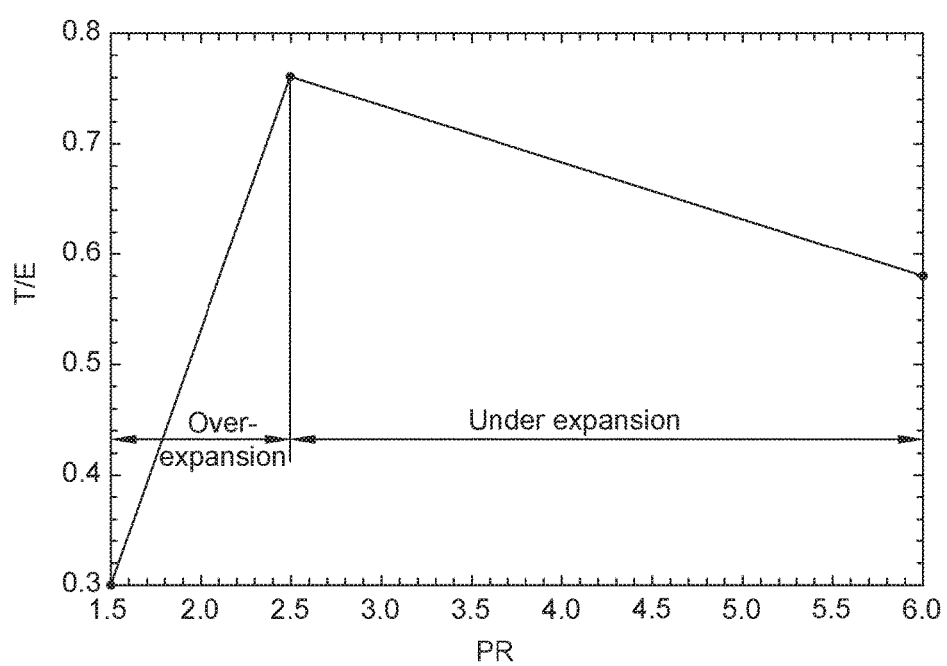
FIG. 16 is a diagram showing the correlation between pressure ratio and isentropic efficiency of the expander.

In FIG. 16 it is shown the variation of the isentropic efficiency of the expander with the pressure ratio, for selected experimental runs in which the thermodynamic state at expander intake (pressure, enthalpy) are about the same. The pressure ratio in horizontal axis represents the ratio between the highest and the lowest pressures, before and after the expander, respectively. If this pressure ratio is lower than the one that correspond to the built-in volume ratio for the given operating condition, then the flow over-expands in the expander and then it must be recompressed to reach the pressure boundary condition at the lower side. This recompression consumes shaft work from the expander itself. The isentropic efficiency degrades hardly. If the pressure at expander exit is lower such that the pressure ratio is higher than the one corresponding to the built-in volume ratio, then the working fluid expands too less within the expander, and it has to reduce its pressure by throttling at the exit port in order to reach the pressure boundary condition. This process represents an additional irreversibility, because the fluid pressure is wasted. The isentropic efficiency degrades slowly in this regime.

Figure 17:
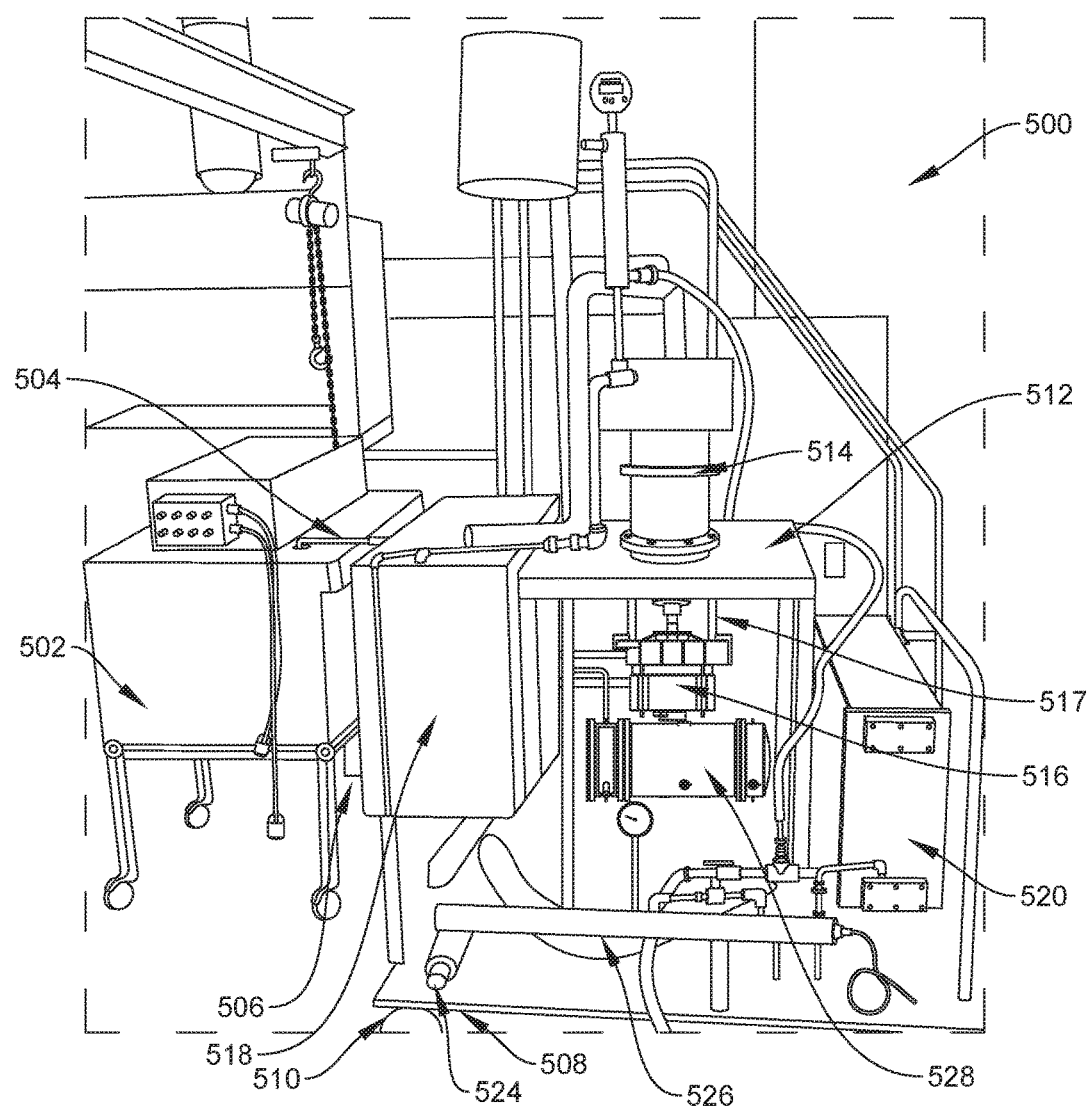
FIG. 17 is a perspective view of the heat engine system connected to heat source in accordance with a non-limiting illustrative embodiment of the present disclosure.

FIG. 17 shows a heat engine system 500 connected to heat source 502 in the form of an oil heater unit via outflow in flow conduits, 504 and 506, respectively. The present examples shows some of the features described herein to further exemplify the system 500 in the form of mobile unit. The system 500 includes a base 508 with rollers 510 in which a support table 512 is mounted for supporting the expander 514 and the power generator 516 via guides 517. The expander 514 is in fluid communication with a desorber 518 mounted to the base 508 via conduit 520 and the desorber 518 is in fluid communication with the heat source 502 via the conduits 504 and 506. A resorber 522 mounted to the base 508 is in fluid communication with a pump 524 mounted to the base via a received conduit 526. As shown the system 500 also includes an oil-cooler 528 mounted to the base 508. Other arrangements can be contemplated by the skilled artisan within the scope of the present disclosure.

Non-limiting applications of the present system include heating and power of residences, commercial building settings, hospitals, small farming facilities and community centers with a system that is highly efficient and insensitive to blackouts.

In an embodiment, the power and heat production range of the blackout-insensitive modular heat engine is of ~20 kWh/day power 40-60 kWh/day heating. The modular system can also be coupled to various sources of heat such as combustion or solar panels with light concentration and show above 20% reduced pollution footprint with respect to traditional technologies. In one embodiment, the present technology is geared towards the general appliances market of furnaces and water boilers for residences and commercial sites. The system is applicable to grid connected as well as remote locations (e.g. cottages etc.). This system can substitute the regular water heaters and furnaces in residences. The system can satisfy completely water heating needs, space heating needs and partially the power needs of residences. It can be configured to satisfy fully the power needs, especially for remote locations. This system can also be used in farming settings or around small industrial facilities.

The system provides a variety of advantages some of which are listed below by way of example only:

The system provides for a Trilateral flash thermodynamic cycle with non-azeotropic mixtures with excellent match of temperature profile at both source and sink.

The system provides for the use of scroll expanders in conjunction to ammonia-water solution as working fluid.

The system provides for the use of a two-phase expansion process which allows efficient regulation of heat engine for best performance under imposed conditions.

The system provides for engine regulation by on-line adjustment of working fluid concentration.

The system provides for an oil free scroll expander which has a channel or port t for injection of cold working fluid in liquid form with the simultaneous roles of lubricant, sealant as well as working fluid.

The present system is more efficient (e.g. 12-18%) than the conventional heat engines (with efficiencies of 2-8% for example).

The present system provides for low-temperature (90-140° C.) heat compared to the conventional systems requiring more than 150° C. The foregoing is appropriate for low-temperature sources (renewables, process heat, waste heat, etc.).

The present system provides for not using a boiler (hence no pinch point).

The present system provides for a match between the temperature profiles of the fluids exchanging heat at both source and sink levels.

The present system operates with a small temperature difference at the heat exchangers.

The present system provides for positive displacement expanders to be used be in two-phase without oil lubrication.

The present system provides for higher energy efficiency due to excellent match of temperature profiles.

The present system is relatively cost effective.

This system offers a great opportunity for the applications where power and heat are needed.

It should be noted that the various components and features of the embodiments described above can be combined in a variety of ways so as to provide other non-illustrated embodiments within the scope of the disclosure. As such, it is to be understood that the disclosure is not limited in its application to the details of construction and parts illustrated in the accompanying drawings and described hereinabove. The disclosure is capable of other embodiments and of being practiced in various ways. It is also to be understood that the phraseology or terminology used herein is for the purpose of description and not limitation. Hence, although the present disclosure has been described hereinabove by way of embodiments thereof, it can be modified, without departing from the spirit, scope and nature of the subject disclosure as defined herein and in the appended claims.

What is claimed is:

1. A heat engine system comprising:
a first heat exchanger comprising a desorber in fluid communication with a low temperature heat source for heating a working fluid therein to produce a heated working fluid;
a positive displacement scroll type expander downstream of the first heat exchanger and in fluid communication therewith for receiving the heated working fluid, the expander comprising a scroll head comprising a pair of interleaving scroll walls, one of the pair of interleaving scroll walls being a fixed scroll wall and the other of the pair of scroll walls being an orbiting scroll wall mounted to a rotating shaft mounted to bearings for orbiting eccentrically in relation to the fixed scroll wall, the expander comprises a gas intake port providing for intake of a superheated vapor as a main intake and a liquid intake port comprising a tube defining an injection channel that is separate from the scroll head;
a second heat exchanger comprising a resorber downstream the expander and in fluid communication therewith for cooling the working fluid received therefrom to produce a cooled working fluid, the second heat exchanger being in fluid communication with the first heat exchanger for providing the cooled working fluid to flow thereto;
a valve assembly interposed between the first and second heat exchangers and comprising an automated three way valve in fluid communication with the second heat exchanger and the expander via the gas and liquid ports for providing for selectively injecting the expander via a conduit in fluid communication with the injection channel with cooled working fluid from the second heat exchanger and for inducing gas intake to increase a concentration of gas within the expander when the working fluid flashes, the valve assembly providing for automatically regulating the concentration and temperature of the working fluid within the expander during the cycle of the working fluid within the system via regulating the flow rate thereof; and a single variable speed pump for both circulating and pressurizing the working fluid, wherein the three-way valve is in fluid communication with the pump and the first heat exchanger, the system is configured to provide adjusting the three-way valve based on pump speed and expander load thereby providing for determining optimum liquid injection, wherein the position and configuration of the injection channel allows for the cooled working fluid received from the conduit to be injected in liquid form between the interleaving scroll walls at a location corresponding to the beginning of the expansion cycle thereby providing for the cooled working fluid to: simultaneously act as a sealant and a coolant for interleaving scroll walls and as a lubricant for the bearings.

2. A heat engine system according to claim 1, wherein the a shaft is in operational communication with magnetic coupling for generating electricity.

3. A heat engine system according to claim 1, wherein the second heat exchanger provides for producing heat from cooling down the working fluid.

4. A heat engine system according to claim 1, wherein the working fluid comprises ammonia-water.

5. A heat engine system according to claim 1, further comprising an additional heat exchanger interposed between the valve assembly and the first heat exchanger to preheat the working fluid.

6. A heat engine system according to claim 5, wherein the additional heat exchanger is in fluid communication with the expander and thereby receives and preheats the working fluid received via the valve assembly by cooling down the fluid received by the expander.

7. A heat engine system according to claim 1, further comprising a superheater interposed between the first heat exchanger and the expander.

8. A heat engine system according to claim 1, wherein the second heat exchanger comprises two heat exchangers providing heating at two different and respective temperature levels.

* * * * *